INVENTORS,
JOHN H. LENNON
WILLIAM S. LITTLE JR.
JOHN C. URBACH
BY

ATTORNEY

United States Patent Office 3,689,267
Patented Sept. 5, 1972

3,689,267
SCREEN MAKING PROCESS UTILIZING
ROTATION OF OPTICAL PLATE
William S. Little, Jr., Rochester, N.Y., and John H.
Lennon and John C. Urbach, Portola Valley, Calif.,
assignors to Xerox Corporation, Stamford, Conn.
Filed Oct. 15, 1970, Ser. No. 80,864
Int. Cl. C03c 5/00
U.S. Cl. 96—38.3         8 Claims

ABSTRACT OF THE DISCLOSURE

A method is herein disclosed for producing a high resolution diffraction grating having a relatively large optical working surface. An optically worked glass substrate is first coated with an even layer of photoresist material. The coated surface is then exposed to a pattern of light interference fringes and the pattern is scanned across the surface in a manner whereby the phase relationship between the interfering light beams remain unaltered at each point on the surface. The rate of scan is controlled to produce a uniform time average exposure of the fringe pattern on the coated surface. The exposed surface is developed by selectively removing the photoresist material from the glass substrate leaving behind a periodic array of extended parallel glass stripes separated by ridges of photosensitive material. The developed surface is next coated with a layer of glass adhering metal and the remaining photosensitive material, with the overlaying metal coatings thereon, is stripped from the substrate leaving behind the metal bar pattern on glass.

This invention relates to a method of producing a diffraction grating and, in particular, to a method of accurately producing a diffraction grating having a relatively large working surface.

In U.S. Pat. 3,436,216 to Urbach, a thermoplastic imaging system is disclosed in which light image of an original is passed through a bar type diffraction grating and the resultant image used to selectively discharge the charged surface of a thermoplastic receptor. The original input scene information is, in effect, is thus used to amplitude modulate the sinusoidal signal produced by passing the light through the grating. The signal is recorded on the receptor surface by heating the thermoplastic to a point whereby the surface deforms in response to the latent image. The original input scene information is thus impressed upon a periodic carrier wave which provides the system a continuous-tone response not ordinarily attainable in this type of imaging system. It has heretofore been a problem securing gratings of a size and nature suitable for use in a thermoplastic imaging system of this type.

Until very recently, most high quality diffraction gratings were produced on machines known as "ruling engines." The ruling engine is a specially designed device capable of machining very fine parallel grooves in a work element, the element generally comprising a metallized glass plate. Under ideal conditions, an engine can only produce about one or two truly good gratings in a year. Because of the inefficiency of the ruling engine, better methods of producing gratings are now being sought. One method that shows considerable promise is a process described by Franks in U.S. Pat. 3,507,564. As disclosed by Franks, a block of photochemical material is exposed by means of an interferometer to a set of light interference fringes. The block is then developed or "fixed" to form a space lattice having varying light transmitting properties.

Although the Franks process is capable of producing a grating having high resolution, it nevertheless has certain disadvantages associated therewith. Because the photochemical material constitutes the grating, the use to which the grating can be put, and the type of grating that can be produced, are both restricted. Furthermore, the size of the grating produced by this process has heretofore been confined to the boundaries of the illumination pattern that can be created by an interferometer. It must also be noted, because of the nature of most interferometric light sources the intensity of the exposure pattern illustrated at the work surface is generally far from uniform. They make it extremely difficult to capture the high resolution image during development because some illuminated areas may be overexposed while, at the same time, other illuminated areas remain underexposed.

It is therefore a primary object of this invention to improve the method of producing a diffraction grating.

It is a further object of this invention to provide a method for producing a high quality diffraction grating having a relatively large working area.

Yet another object of this invention is to improve the photoetching method of producing a diffraction grating.

A still further object of this invention is to improve the method of making a bar type diffraction grating suitable for use in thermoplastic xerography.

These and other objects of the present invention are attained by coating the surface of a work element with a relatively uniform coating of photoresist material, exposing the coated surface to a light pattern of interference fringes, moving the light interference fringe pattern beyond the boundaries of the original formulated pattern without disturbing the phase relationship between the interfering light beams so that a uniform time average exposure of the pattern is produced in the surface, developing the uniformly exposed photoresist material whereby the material is selectively removed from the work element in the light struck areas to produce a periodic array of smooth valleys separated by ridges of photoresist material, depositing a thin layer of metal over the developed work element and then stripping the remaining photoconductive material with the overlying thin layer of metal thereon from the work element to produce a high resolution grating made up of a periodic array of glass stripes separated by metal bars.

For a better understanding of the invention as well as other objects and further features thereof, reference is had to the following detailed description of the invention to be read in conjunction with the accompanying drawings wherein.

Figure 1:
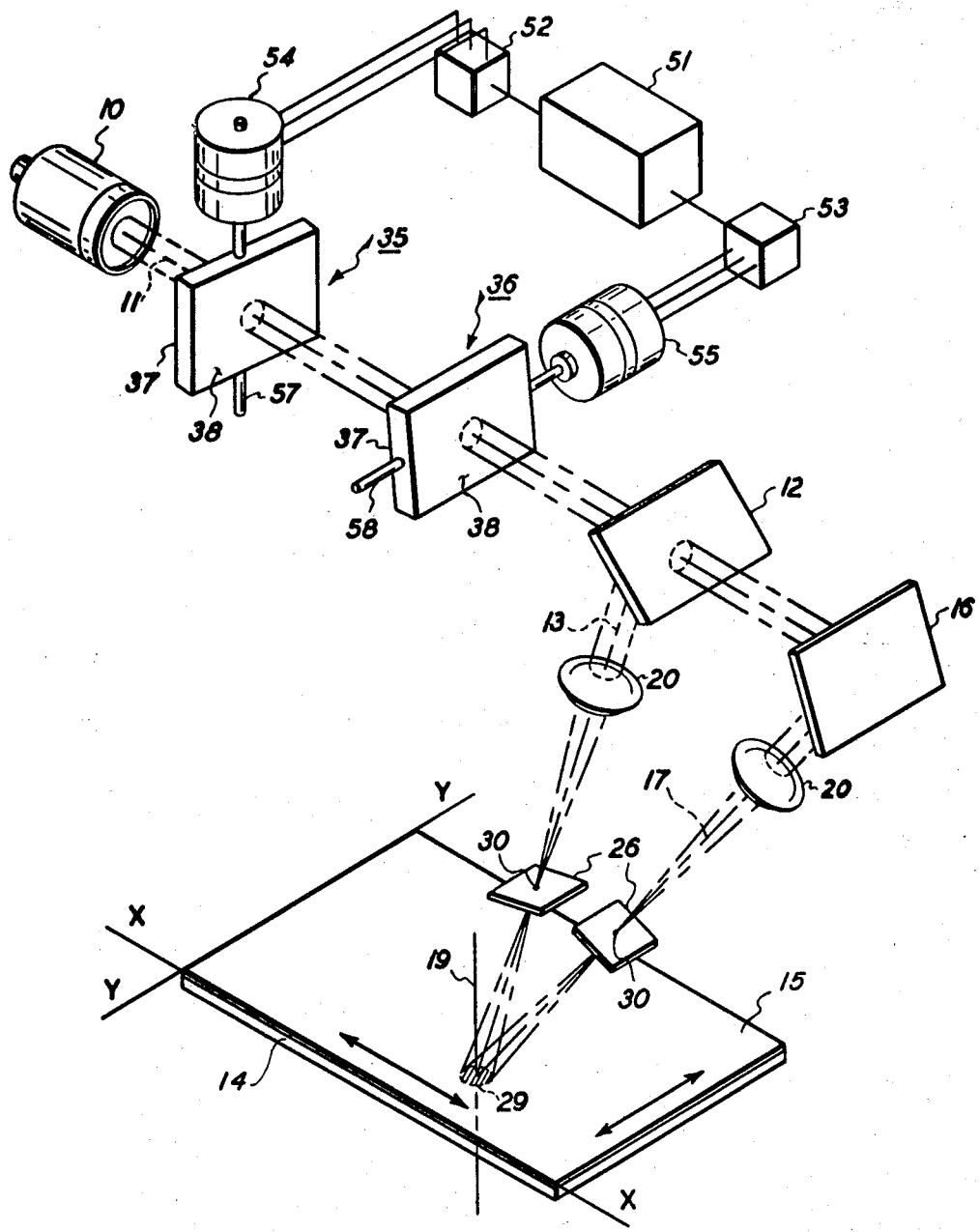
FIG. 1 is a schematic view in perspective of apparatus for producing a diffraction grating in accordance with the teachings of the present invention.

Referring now specifically to FIG. 1 a point source of light energy 10 is arranged to direct a beam of highly coherent collimated light 11 incident upon a beam splitter 12 wherein a portion of the light energy is redirected along a first optical path 13 towards the work element 14, the top surface of which is positioned in a read-out plane 15 defined by the coordinates ($x$) and ($y$). A portion of the light energy is transmitted through the beam splitter and then redirected by means of a reflecting surface 16 along a second optical path 17 towards the work element. The beam splitter and the light reflecting surface are both arranged so that the two redirected light beams are superimposed at the plane described by the (x) and (y) coordinates.

Two identical projection lenses 20 are mounted in each of the optical light paths 13 and 17 associated with the redirected light beams. The lenses serve to both expand the original light image in the read-out plane and convert the original plane wave front of light energy entering the lens to a spherical wave front. The divided light beams are then recombined in the read-out plane and serve to produce an extremely stable interferometric pattern in the manner of Fresnel's bi-prism or Young's double pin hole apparatus.

Any dust particles entering the system will diffract the collimated light and produce unwanted noise in the exposure pattern. A pair of spatial filters 26 are provided to minimize this noise. The filters are positioned in the back focal plane of each lens and have a clear aperture 30 formed therein being of a size sufficient to pass the focal spot of the associated lens.

The intensity distribution of the energy in a conventional laser beam normally is bell shaped, or gaussian, in cross-section. A high percentage of this energy is concentrated about the center of the beam with the intensity falling off in all directions away from the axis of the beam. Although the light energy undergoes a change in wave form as it passes through the system, the intensity distribution of the energy nevertheless remains unchanged so that the distribution in the exposure pattern is a direct reflection of that of the source and therefore non-uniform. In order to accomplish uniform exposure of a large work element without wasting a large percentage of the light energy, the exposure pattern is scanned across the read-out plane of the apparatus. However, conventional scanning methods cannot be used. These techniques generally result in the interference fringes being moved with respect to the surface, thereby obliterating the stationary fringe pattern which is required to expose the photoresist material.

Means are herein provided for exposing the working surface of the work element 14 supported in plane 15 (FIG. 1) to a translating intensity pattern whereby the positions of the interfering fringes remain unaltered. Movement of the fringe pattern in the read-out plane is accomplished by means of a pair of transparent plates 35, 36, preferably constructed of glass, that are rotatably supported in the original laser beam 11 at some point between the light source and the beam splitter. Although not necessary for the practice of the present invention, the axis of rotation of the individual glass plates is shown passing near the optical center line of the original laser beam.

Figure 2:
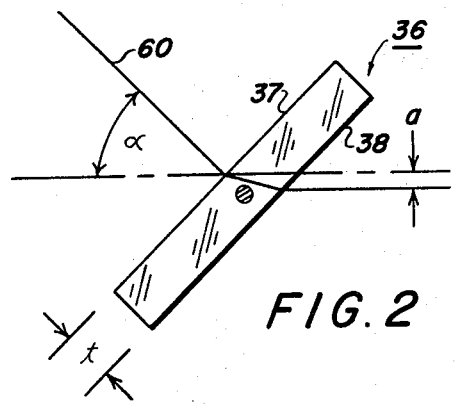
FIG. 2 is a side view of a plate for controlling the lateral displacement of the illumination pattern of interfering fringes.

Each plate is prepared having a light receiving surface 37 and a light exit surface 38 that are substantially flat and are parallel in relation to each other. When the plates are positioned with the light receiving surface normal to the original laser beam, the light rays travel in a straight line from a source to the beam splitter. However, obliquely repositioning either of the plates within the beam cause the beam to be laterally displaced. As illustrated in FIG. 2, a single ray of light passing through the plate behaves at the interfaces in accordance with Snell's law and, because the light entrance face is parallel to the light exit face, the existing beam is also parallel to the entering beam. However, it will be noted that the existing light beam is displaced some distance ($d$) from the entering beam; the distance being dependent on the thickness ($t$) of the plate and the angle of incidence ($\alpha$) at which the beam strikes the entrance face. It has been found, that when the original light beam is displaced in the manner herein described, the illuminated interference pattern is translated in the read-out plane without disturbing the precise locations of the interference fringe lines.

A test was conducted employing apparatus similar to that herein described in which a single ¼ inch thick glass plate was repositionably supported in the output beam of a laser. The outer edges of the plate were masked with an opaque tape and the flat parallel light receiving and light exit faces rotated through the laser beam at approximately 180 r.p.m.'s. In this manner, the illuminated fringe pattern was continually translated across the read-out plane. A portion of the read-out plane was observed under a 500x microscope revealing that the fringe pattern, that is, the light and dark fringes in the observed region, was extremely stable. No changes were discernible in the locations of the light and dark fringes. The bright fringes remained in a stationary position and only the level of intensity of these particular fringes changed as the illuminated exposure pattern was translated across the observed region.

The positioning of the individual light transmitting plates 35 and 36 is controlled through means of a programming network consisting of a digital computer 51, a pair of pulse generators 52 and 53, and reversible stepping motors 54 and 55. Plates 35 and 36 are rotatably supported upon segmented shafts 57, 58, respectively, and the shafts directly coupled to the associated stepping motors as shown in FIG. 1. Plate 36 serves to control the horizontal movement of the illumination pattern in the ($x$) direction of the read-out plane while plate 35 is arranged to control the pattern in the ($y$) direction. In operation, a predetermined motion is imparted to the horizontal control plate 36 by the previously described control network whereby the light entrance face 37 is rotated through the entering light beam over a predetermined path of travel.

In practice, the normal 60 (FIG. 2) to the light entrance surface is generally moved approximately 45° to either side of the optical center line 61 of the entering light beam by means of the reversible stepping motor 55. As the light entrance face of the plate 36 is swept back and forth over the prescribed path of travel, the exposure pattern in the read-out plane is caused to sweep back and forth in the ($x$) direction. However, after the completion of each horizontal sweep, and before the direction of the sweep is reversed, the vertical control plate 35 is repositioned in regard to the entering light beam by means of the associated stepping motor 54. The illumination pattern on the return sweep is caused to traverse path of travel substantially parallel to, but offset from, the subsequent sweep so that the exposure pattern is translated across the entire surface of the work element.

The work element 14 positioned in the read-out plane of the present apparatus comprises a carefully cleaned ¼ inch thick glass plate that is dip coated with about 0.3 micron of high resolution photoresist material 70 that becomes selectively soluble or insoluble when exposed to light energy. One such material is available through the Shipley Company of Newton, Mass. and is marketed under the trade name AZ–1350 Photo Resist. The thickness variation of the coating is kept below ±100 angstrom units by using a hydraulically controlled dip coating apparatus that is isolated from vibrations and is protected from conductive air currents. The plate is prepared in a "clean room" to eliminate dust.

The coated plate is then exposed to a pattern of illumination generated by interfering two coherent diverging light beams from a continuous wave laser that operates in the blue-violet or ultraviolet range in the manner described above. The light pattern produced at the coated surface consists of alternate light and dark fringes having a sinusoidal profile. It has been found that the fringe lines can be held parallel to within 3 minutes of arc over the entire area of a 9 inch x 9 inch plate when the plate is positioned about six feet from the optical lenses as shown in FIG. 1. The line to line spacing is determined by the approximate relationship:

$$x = \lambda \left(\frac{D}{d}\right)$$

where:

λ = the output wavelength of the illumination source,
D = the optical distance between either lens and the working surface of the grating, and
d = the optical distance between the two lenses.

By changing either D or d, the fringe line spacing can be easily varied between 1 and 10 microns which would correspond to a spatial frequency of about 100 to 1000 lines per millimeter.

Control plates 35 and 36 are moved through a predetermined path of travel whereby the interference fringe pattern is scanned in the read-out plane to produce a time average exposure of the illumination pattern over the entire optical working surface of the grating. To achieve these results, the individual plates are periodically repositioned in the respective entering light beams by means of a reversible stepping motor 54, 55 operatively associated therewith. The stepping function of each motor is regulated by phase generators 52, 53, respectively, whose operation is governed by computer means 51. The computer output is programmed to regulate the movement of the control plates whereby a uniform time average exposure of the illumination pattern is obtained on the read-out plane. Although, in this particular case, the instantaneous intensity pattern is gaussian in shape, it should be apparent to those skilled in the art that the particular apparatus herein disclosed is capable of producing a uniform time average exposure in a read-out plane regardless of the energy distribution of the original input beam.

Figure 3:
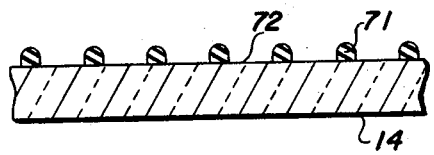
FIG. 3 is a partial sectional view through the diffraction grating shown in FIG. 1 after development of the photosensitive material thereon.

When utilizing a laser light source having a 200 milliwatt output and operating at about λ=4579 angstroms, an exposure time in the order of approximately 1 hour is required to insure proper development of the photoresist coating material on a 9 inch x 9 inch plate. After exposure, the coated glass plate is removed from the exposure station and placed in a spray development station. Here, an atomized spray of photoresistive developer solution, also available through the Shipley Company under the name AZ Developer, is directed at the imaged working surface of the grating. A sufficient quantity of developer is sprayed into contact with the coated surface to insure that the photosensitive material is developed in the exposed areas at a predetermined desired rate. Typically, complete removal of the exposed photosensitive material from the element is accomplished in about 30 seconds when the surface is sprayed with developer at a temperature of approximately 57° F. Development is then quickly stopped by flushing the coated working surface of the grating with distilled water. As illustrated in FIG. 3, the developed grating 14 is composed of a periodic array of parallel glass lines positioned between ridges 71 of photoresistive material with the glass lines 72 extending across the entire working surface of the grating.

Figure 4:
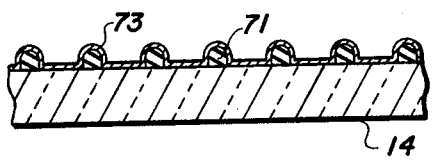
FIG. 4 is a partial sectional view through the diffraction grating showing a thin layer of metal placed over the developed coating thereon.

The developed plate is then coated with a thin layer of glass adhering metal 73 (FIG. 4), such as chromium or the like, using well known vacuum deposition techniques. A high degree of deposition uniformity is achieved during this step by optimizing the evaporator geometry so that a thin coating of metal about 150 angstroms thick is placed on the surface. The coated layer follows the contour of the surface consisting of both the glass spaces and the photoresistive ridges.

Figure 5:
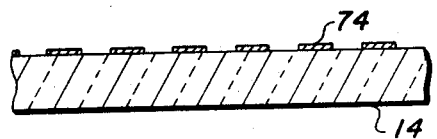
FIG. 5 is a partial sectional view through the diffraction grating showing a completed grating after the remaining photosensitive coating is stripped therefrom.

The coated plate is finally immersed in a bath of stripping solution, also available through the Shipley Company, and mildly swabbed with a non-abrasive cloth to remove the remaining photosensitive material. The stripping solution acts to dissolve the photoresist ridges from beneath the metallic covering and causes a complete removal of the metal from these regions. The metal coating in direct contact with the glass surface is unaffected by the stripping solution and remains behind as a periodic array of fine parallel bars 74 (FIG. 5). This metal on glass bar type diffraction grating is then once again rinsed with distilled water and finally dried with finely filtered air. Diffraction gratings have optical working surfaces of approximately 9 inches x 9 inches and having a resolution of approximately 400 line pairs per millimeter has been produced with no difficulty by employing the process herein disclosed. Because of the high edge acuity exhibited by these gratings, it would appear probably that grating having resolutions in the range of 1000 line pairs per millimeter could be constructed in accordance with the teachings of the present invention.

While this invention has been described with reference to the structure disclosed herein, it is not necessarily confined to the details as set forth in this application is intended to cover such modifications or changes as may come within the scope of the following claims.

What is claimed is:

1. A method of producing a diffraction grating comprising
    passing a parent beam of coherent radiation through at least a first optically flat plate,
    splitting said parent beam into two component beams and recombining the component beams to form an interference pattern superimposed on a photosensitive member,
    rotating said first flat plate about a first axis to move said interference pattern over the photosensitive member along a first coordinate.

2. The method of claim 1 further including passing the parent beam through a second flat plate and rotating said second plate about a second axis to move the interference pattern over the photosensitive member along a second coordinate.

3. The method of claim 1 wherein said photosensitive member includes a relatively uniform layer of photoresist material coated onto a substantially flat surface of a support element.

4. The method of claim 1 further including the step of controlling the movement of the flat plate and of the light interference pattern to produce a uniform time average exposure in the plane of said surface.

5. The method of claim 3 further including removing the exposed photoresist material from said support element to form a periodic array of parallel ridges of photoresist material thereon, metallizing the ridge bearing surface and stripping the remaining metal coated ridges from said surface leaving a periodic array of fine metal bars on said support element.

6. The method of claim 5 wherein the light transmitting property or reflecting property of said support element differ from those of said metal bars.

7. The method of claim 5 wherein said metal includes a glass adhering material.

8. The method of claim 5 wherein the periodic array of parallel ridges is metallized by vacuum evaporating a thin layer of chromium thereon.

References Cited

UNITED STATES PATENTS

| | | | |
|---|---|---|---|
| 3,524,394 | 8/1970 | Sunners | 350—285 |
| 3,565,514 | 2/1971 | Bate et al. | 350—285 |
| 3,488,102 | 1/1970 | Buck et al. | 350—285 |
| 3,484,269 | 12/1969 | Jonkers et al. | 96—36.1 |

FOREIGN PATENTS

| | | | |
|---|---|---|---|
| 1,094,484 | 12/1960 | Germany | 96—38.3 |
| 1,103,109 | 12/1964 | Great Britain | 96—38.3 |
| 1,080,364 | 3/1964 | Great Britain | 96—38.3 |

NORMAN G. TORCHIN, Primary Examiner

E. C. KIMLIN, Assistant Examiner

U.S. Cl. X.R.

96—36.1